(12) United States Patent
Losey

(10) Patent No.: US 6,215,457 B1
(45) Date of Patent: Apr. 10, 2001

(54) TRANSMITTER AND / OR RECEIVER UNIT FOR AN ANTITHEFT SYSTEM OF A MOTOR VEHICLE

(75) Inventor: Allan Losey, Ortonville, MI (US)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/395,315

(22) Filed: Sep. 13, 1999

(30) Foreign Application Priority Data

Sep. 16, 1998 (DE) .............................. 198 42 427

(51) Int. Cl.$^7$ ...................................... H01Q 1/50
(52) U.S. Cl. .................. 343/906; 343/702; 343/711; 343/713; 439/63; 439/350
(58) Field of Search .................. 343/700 MS, 713, 343/702, 715, 712, 704, 711, 903, 906, 807; 439/63, 350, 357, 603, 586, 620, 578; H01Q 1/32, 1/34, 1/22, 1/50

(56) References Cited

U.S. PATENT DOCUMENTS

| 5,476,394 | * | 12/1995 | Zigler et al. ................. | 439/620 |
| 5,565,877 | * | 10/1996 | Du et al. .................... | 343/715 |
| 5,844,524 | | 12/1998 | Kraicyzk et al. ............ | 343/700 MS |
| 5,940,046 | * | 8/1999 | Saleem .................... | 343/872 |
| 5,973,645 | * | 10/1999 | Zigler et al. ............... | 343/3 |
| 6,022,239 | * | 2/2000 | Wright .................... | 439/354 |
| 6,043,782 | * | 3/2000 | Dishart et al. ............. | 343/713 |

FOREIGN PATENT DOCUMENTS 196 14 362
C1 7/1997 (DE) .

OTHER PUBLICATIONS

Japanese Patent Abstract No. 08222924 A, dated Aug. 30, 1996.

* cited by examiner

*Primary Examiner*—Tho Phan
(74) *Attorney, Agent, or Firm*—Herbert L. Lerner; Laurence A. Greenberg; Werner H. Stemer

(57) ABSTRACT

A transmitter and/or receiver unit has a plug-type connector mounted on a printed circuit board. The electrical contact elements of the plug-type connector are soldered at one end to the printed circuit board. At least one of the electrical contact elements of the plug-type connector and an additional lead disposed in or on a housing of the plug-type connector, form an antenna for the transmitter and/or receiver unit.

9 Claims, 1 Drawing Sheet

TRANSMITTER AND / OR RECEIVER UNIT FOR AN ANTITHEFT SYSTEM OF A MOTOR VEHICLE

BACKGROUND OF THE INVENTION

Field of the Invention

The invention pertains to a transmitter and/or receiver unit for an antitheft system of a motor vehicle. The unit has a printed circuit board carrying an electronic circuit and a plug-type connector with electrical contact elements which are electrically connected, at their printed circuit board ends, to the circuit via conductor tracks of the printed circuit board.

Commonly assigned U.S. Pat. No. 5,844,524 (German patent No. DE 196 14 362 C1) describes a transmitter and receiver unit with a circuit on a printed circuit board. An associated antenna is embodied in the form of conductor tracks both on the upper side and on the underside of a printed circuit board. The printed circuit board has, along the conductor tracks, through-plated holes through which the conductor tracks on the upper side are electrically connected to those on the lower side. The effective radiant surface of the antenna is thus increased.

The attachment of the printed circuit board, for example by clamping mounts in the region of the conductor tracks, can result in the conductor tracks of such an antenna being mechanically eroded in the course of time owing to shaking stresses by the mounts resting on the printed circuit board. The conductor tracks are then abraded and the antenna is then no longer effective, or can be used only to a limited degree, owing to its shortened electrical length. Furthermore, the antennas on the printed circuit board take up a very large amount of space. The printed circuit board layout has to be adapted to the antenna. In particular, electromagnetic compatibility has to be allowed for.

Japanese patent abstract JP 08222924 A discloses a plug-type connector which has a contact element that is not connected to other elements (an idle terminal). That contact element is used as a receiving antenna. However, the plug-type connector does not have any additional parts of an antenna.

SUMMARY OF THE INVENTION

It is accordingly an object of the invention to provide a transmitter and/or receiver unit, which overcomes the above-mentioned disadvantages of the heretofore-known devices and methods of this general type and which is simple and compact in its structural design.

With the foregoing and other objects in view there is provided, in accordance with the invention, a transmitter and/or receiver unit for a motor vehicle, comprising:
a printed circuit board carrying an electronic circuit and a plurality of conductor tracks;
a plug-type connector with a plurality of electrical contact elements each having a plug end and, distally from the plug end, a circuit board end electrically connected to the conductor tracks of the printed circuit board;
at least one of the electrical contact elements being connected as an antenna of the transmitter and/or receiver unit; and
a lead connected to the plug end of the at least one electrical contact element and mounted in or on the plug-type connector, the lead and the at least one electrical contact element together forming an antenna of the transmitter and/or receiver unit.

In other words, the unit has a printed circuit board on which an electronic circuit is arranged. A plug-type connector is also mounted on the printed circuit board. The plug-type connector has electrical contact elements which are led through the housing of the plug-type connector. At least one electrical contact element of the plug-type connector is used as part of an antenna of the transmitter and/or receiver unit.

This has the advantage that an antenna does not need to be arranged on the printed circuit board. The space on the printed circuit board can thus be used for the components required for the circuit. Since the plug-type connector is present in any case, it is used to hold the antenna.

In accordance with an added feature of the invention, the plug-type connector comprises a plug housing and the lead is injection molded into the plug housing together with the contact elements.

In accordance with an additional feature of the invention, the plug-type connector has a groove formed therein and the lead is embedded in the groove.

In accordance with a concomitant feature of the invention, the plurality of electrical contact elements are mutually spaced apart by given spacing distances and a spacing distance between the at least one contact element connected to the lead and an adjacent the contact element is greater than a spacing distance between respective other the contact elements.

Other features which are considered as characteristic for the invention are set forth in the appended claims.

Although the invention is illustrated and described herein as embodied in a transmitter and/or receiver unit for an antitheft system of a motor vehicle, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

The exemplary transmitter and/or receiver unit according to the invention is used, in particular, for an antitheft system of a motor vehicle. Signals are thereby transmitted and/or received by the transmitter and/or receiver unit. The received signals are tested for their authorization and, if they are authorized, doors are unlocked or an immobilizer of the vehicle is released.

In the following description of the exemplary embodiment, the transmitter and/or receiver unit is considered as a receiver unit only. Of course, it can also serve as a transmitter unit.

Figure 1:
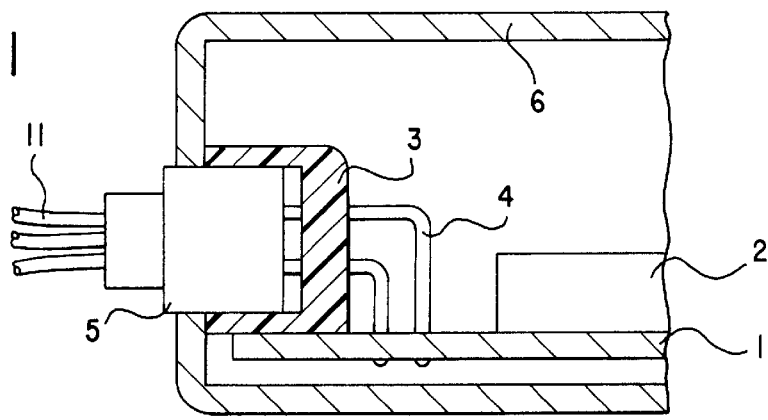
FIG. 1 is a partial sectional view taken through a transmitter and/or receiver unit according to the invention.

Referring now to the figures of the drawing in detail and first, particularly, to FIG. 1 thereof, there is seen a receiver unit with a printed circuit board 1 on which an electronic circuit with its components 2 is arranged. Arranged on the printed circuit board 1 is a plug-type connector 3 which is mounted, with its electrical contact elements 4 (for example contact springs or contact pins), in the printed circuit board 1, for example by soldering. By means of a suitable mating plug 5 it is possible to establish electrical links to the outside, such as to a bus system or a cable 11, so as to connect the board 1 to other electrical devices in the motor vehicle. The printed circuit board 1 is arranged within a housing 6, and the plug-type connector 3 in the wall of the housing 6 constitutes the electrical interface to the outside.

According to the invention, at least one electrical contact element 4 of the plug-type connector 3 is used at least as part of an antenna of the receiver unit on the printed circuit board 1. In this case, when the mating plug 5 is plugged on, it does not enter into contact with such a contact element 4, so that the contact element 4 acts as an open electrical circuit, and thus acts as an antenna. Such an antenna can also be referred to as a rod antenna. Signals can then be received electromagnetically (or transmitted in the case of a transmitter unit) via the contact element 4.

Figure 2:
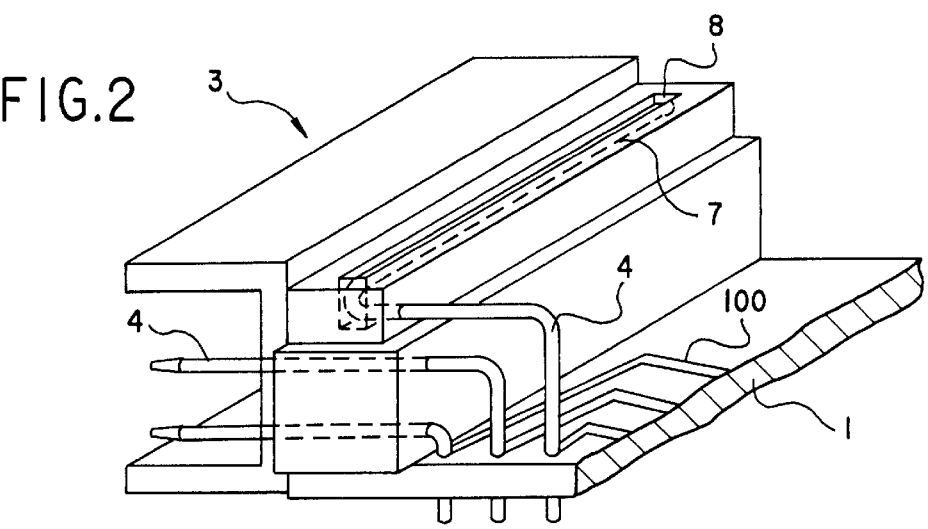
FIG. 2 is a perspective and partly sectional view of a plug-type connector of the transmitter and/or receiver unit according to FIG. 1.

With reference to FIG. 2, it is additionally possible to lay a lead 7 in a groove 8 of the plug-type connector 3 and to connect the lead to the contact element 4. The electrical length of the antenna is thereby increased, as a result of which signals can be received at relatively low frequencies. The lead 7 can also be connected to the contact element 4 when the plug-type connector 3 is fabricated, and can subsequently be encapsulated by injection molding in one operation together with the injection molding of the plug casing of the plug-type connector 3. The lead 7 is thus fixed in position in a defined position and protected against external influences.

Figure 3:
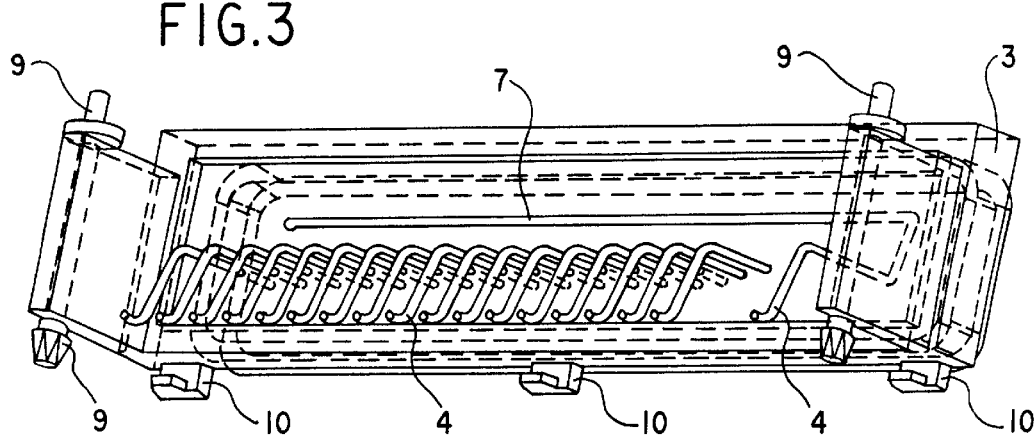
FIG. 3 is a perspective view of another plug-type connector of the transmitter and/or receiver unit according to FIG. 1.

The contact element 4, which forms part of the antenna, can be arranged at a relatively great distance from the remaining contact elements 4 of the plug-type connector 3 (cf. FIG. 3). Electromagnetic interference influences of the other contact elements 4 on the antenna, and vice versa, are thus reduced.

The lead 7 is preferably designed as an unshielded lead and, in the present exemplary embodiment, it is preferably laid transversely with respect to the contact elements 4 of the plug-type connector 3.

The effective electrical overall length of the contact elements 4 and, if appropriate, of the leads 7 which serve as antenna are tuned here to the wavelength $\lambda$ (or fractional parts $\lambda/n$ or integral multiples $n*\lambda$) of the signals to be received. When the system is used in a motor vehicle, for example, then the permissible carrier frequency is 315 MHz in the United States (and Japan). A permissible carrier frequency in Germany/Europe is 433 MHz.

If a further lead, in addition to the contact element 4, is additionally required as antenna, the lead 7 can be soldered, welded or plugged on to the contact element 4. It is important here that an interface is produced which has as little ohmic contact resistance as possible so that the signals which are to be transmitted are not disrupted. The antenna is electrically connected to the printed circuit board 1 via the transmitter and/or receiver unit and via conductor tracks 100 of the printed circuit board 1. The conductor tracks 100, which are illustrated on the upper surface of the circuit board 1 in FIG. 2 for simplicity of the illustration, can already be embodied as an antenna (idle conductor track) and in this case extend the electrical length of the antenna.

Such an antenna takes up little space itself. The layout of the printed circuit board 1 can be tailored here completely to the transmitter and/or receiver unit. In the presently disclosed antennas, the electromagnetic energy is irradiated along the surface of the contact elements 4 and the leads 7. The external shape and the positioning of the contact elements 4 and the location in which the leads 7 are laid determine here the receive characteristics (directional characteristics) of the antenna. For this reason, desired directional characteristics can be set by laying the antenna in an appropriate way.

The type of the plug-type connector 3 is insignificant for the invention. A pin-type connector, male multipoint connector or female multipoint connector may be used. The plug-type connector 3 may be of single-row, double-row or multirow design. The essential factor is that at least one contact element 4 of the plug-type connector 3 is used as part of an antenna. The antenna is formed here by a conductor track between the transmitter and/or receiver unit and the plug-type connector 3, a contact element 4 and, if appropriate, an additional lead 7 which is electrically connected to the contact element 4.

The plug-type connector 3 can be bent here with its contact elements 4 through 90° (cf. FIG. 2). Straight contact elements 4 are also possible. The contact elements 4 are electrically connected at one end (printed circuit board end) to the printed circuit board 1. For this purpose, the contact elements 4 are plugged through holes in the printed circuit board 1 and soldered. Electrical clamping connections are also possible. The plug-type connector 3 can also be designed as an SMD plug-type connector 3 (cf. FIG. 3) whose contact elements 4 are bent at the printed circuit board ends so that they can be soldered to the surface of the printed circuit board 1.

At the other ends (plug ends), the contact elements 4 are electrically connected to contact elements of a matching mating plug 5 if the two plug-type connectors 3 and 5 are plugged together.

The plug-type connector 3 can be soldered with its contact elements 4 into the printed circuit board 1 and thus mounted thereon. Likewise, the plug-type connector 3 can have other mounting means, such as expanding pins 9 and/or mounts 10, which are used to mount the plug-type connector 3 on the printed circuit board 1 (cf. FIG. 3). The contact elements 4 are electrically connected to the conductor tracks or contact faces on the printed circuit board 1 by soldering, welding or pressing into through-plated holes.

The contact element 4, which is part of the antenna, can be one of the contact elements 4, present in any case, of the plug-type connector 3. However, a separate contact element 4 can also be inserted or pressed into the plug-type connector 3. As a result of the antenna being integrated into the plug-type connector 3, the antenna is a large distance from the ground of the printed circuit board 1 and from the metallic bodywork of the motor vehicle and is therefore not disruptively influenced by them.

If there is no ground present in the vicinity of the conductor tracks, the contact elements 4 or the leads 7 of the antenna, the antenna has its maximum effect and radiates signals well or receives signals particularly well.

The antenna can be used both to transmit signals and receive signals (if appropriate transmitter units such as modulator and amplifier, or receiver units such as demodulators, are present on the printed circuit board 1). Usually, this takes place at a radio frequency, for example at 433 MHz. It is sufficient if just one transmitter unit or just one receiver unit is arranged on the printed circuit board 1. Likewise, a common transmitter and receiver unit can be arranged on said printed circuit board 1.

A plurality of contact elements 4 with leads 7 of different lengths may also be used. Thus, the transmitter and/or receiver unit can be used to an optimum degree at different transmission/reception frequencies.

The transmitter and/or receiver unit according to the invention can be used wherever it is arranged in an electrical device with a plug-type connector 3 and is intended to transmit and/or receive signals.

I claim:

1. A transmitter and/or receiver unit for an antitheft system of a motor vehicle, comprising:

a printed circuit board carrying an electronic circuit and a plurality of conductor tracks;

a connector with a plurality of electrical contact elements each having a plug end and, distally from said plug end, a circuit board end electrically connected to said conductor tracks of said printed circuit board;

at least one of said electrical contact elements being connected as an antenna of the transmitter and/or receiver unit; and a lead connected to said plug end of said at least one electrical contact element and mounted at said connector, said lead and said at least one electrical contact element together forming said antenna of the transmitter and/or receiver unit, wherein said lead is integrated in said connector.

2. The unit according to claim 1, wherein said connector comprises a plug housing and said lead is injection molded into said plug housing together with said contact elements.

3. The unit according to claim 1, wherein said connector has a groove formed therein and said lead is embedded in said groove.

4. The unit according to claim 1, wherein said plurality of electrical contact elements are mutually spaced apart by given spacing distances and a spacing distance between said at least one contact element connected to said lead and an adjacent said contact element is greater than a spacing distance between respective other said contact elements.

5. A transmitter and/or receiver unit for an antitheft system of a motor vehicle, comprising:

a printed circuit board carrying an electronic circuit and a plurality of conductor tracks;

a connector with a plurality of electrical contact elements each having a plug end and, distally from said plug end, a circuit board end electrically connected to said conductor tracks of said printed circuit board;

at least one of said electrical contact elements being connected as an antenna of the transmitter and/or receiver unit; and a lead connected to said plug end of said at least one electrical contact element and mounted at said connector, said lead and said at least one electrical contact element together forming said antenna of the transmitter and/or receiver unit, wherein said lead is mounted on said connector.

6. The unit according to claim 5, wherein said connector has a groove formed therein and said lead is embedded in said groove.

7. The unit according to claim 5, wherein said plurality of electrical contact elements are mutually spaced apart by given spacing distances and a spacing distance between said at least one contact element connected to said lead and an adjacent said contact element is greater than a spacing distance between respective other said contact elements.

8. A transmitter and/or receiver unit for an antitheft system of a motor vehicle, comprising:

a printed circuit board carrying an electronic circuit and a plurality of conductor tracks;

a connector with a plurality of electrical contact elements each having a plug end and, distally from said plug end, a circuit board end electrically connected to said conductor tracks of said printed circuit board;

at least one of said electrical contact elements being connected as an antenna of the transmitter and/or receiver unit; and a lead connected to said plug end of said at least one electrical contact element and mounted at said connector, said lead and said at least one electrical contact element together forming said antenna of the transmitter and/or receiver unit, wherein said connector has a groove formed therein and said lead is embedded in said groove.

9. The unit according to claim 5, wherein said plurality of electrical contact elements are mutually spaced apart by given spacing distances and a spacing distance between said at least one contact element connected to said lead and an adjacent said contact element is greater than a spacing distance between respective other said contact elements.

* * * * *